(12) United States Patent
Chen (10) Patent No.: US 12,536,946 B2
(45) Date of Patent: Jan. 27, 2026

(54) IMAGE DISPLAYING METHOD AND HOST (71) Applicant: HTC Corporation, Taoyuan (TW)

(72) Inventor: Mao-Chang Chen, Taoyuan (TW)

(73) Assignee: HTC Corporation, Taoyuan (TW)

(*) Notice: Subject to any disclaimer, the term of this patent is extended or adjusted under 35 U.S.C. 154(b) by 189 days.

(21) Appl. No.: 18/481,997

(22) Filed: Oct. 5, 2023

(65) Prior Publication Data
US 2025/0118243 A1 Apr. 10, 2025

(51) Int. Cl.
G09G 3/20 (2006.01)

(52) U.S. Cl.
CPC ....... *G09G 3/2096* (2013.01); *G09G 2320/02* (2013.01); *G09G 2340/0435* (2013.01)

(58) Field of Classification Search
CPC ............. G09G 3/2096; G09G 2320/02; G09G 2340/0435
USPC .......................... 345/522, 205; 348/52; 700/1
See application file for complete search history.

(56) References Cited

U.S. PATENT DOCUMENTS

| | | | | |
|---|---|---|---|---|
| 2007/0038939 A1* | 2/2007 | Challen | ................. | G05B 15/02 700/1 |
| 2008/0168106 A1* | 7/2008 | Freedman | ............... | G06F 16/27 |
| 2014/0152784 A1* | 6/2014 | McCoy | ............... | H04N 13/194 348/52 |
| 2016/0098959 A1* | 4/2016 | Moon | .................. | G09G 3/2092 345/205 |
| 2019/0122327 A1* | 4/2019 | Jeon | ........................ | G09G 5/001 |
| 2020/0005736 A1* | 1/2020 | Peng | ...................... | G09G 5/377 |
| 2022/0093056 A1 | 3/2022 | Macias et al. | | |
| 2022/0201201 A1* | 6/2022 | Chen | ...................... | H04N 23/64 |
| 2023/0335081 A1* | 10/2023 | Fan | ...................... | G09G 3/2096 |

FOREIGN PATENT DOCUMENTS

| | | |
|---|---|---|
| CN | 109254849 | 1/2019 |
| CN | 110018874 | 7/2019 |
| TW | 202219737 | 5/2022 |

OTHER PUBLICATIONS

Peng De-IiAng; Vertical synchronization method and device, terminal and storage medium; Jul. 16, 2019; OPPO Guangdong Mobile Telecommunications CO LTD; CN110018874 (A); paras. 18-166; English.*

Peng De-IiAng; Vertical synchronization method and device, terminal and storage medium; Jul. 16, 2019; OPPO Guangdong Mobile Telecommunications CO LTD; CN110018874 (A); paras. 18-166; Chinese.*

"Office Action of Taiwan Counterpart Application", issued on Nov. 7, 2024, p. 1-p. 7.

* cited by examiner

*Primary Examiner* — Prabodh M Dharia (74) *Attorney, Agent, or Firm* — JCIPRNET (57) ABSTRACT

An image display method is provided. The image displaying method includes the following steps. A request signal for a vertical synchronization signal for rendering an image of a next frame is transferred from an application to a handler layer of a system. In response of the receiving the request signal by the handler layer, the handler may be configured to generate a local vertical synchronization signal without referencing a hardware vertical synchronization signal. The application may be configured to render the image of the next frame based on the local vertical synchronization signal.

15 Claims, 4 Drawing Sheets

IMAGE DISPLAYING METHOD AND HOST

BACKGROUND

Technical Field

The disclosure relates to an image displaying method; particularly, the disclosure relates to an image displaying method and a host.

Description of Related Art

While an application or a view is displayed by a display, a frame rate of the graphic processing unit (GPU) and a refresh rate of the display are two important factors. If there is a discrepancy between the frame rate of the GPU and the refresh rate of the display, a tearing may be shown on the displayed image on the display. In order to make the frame rate of the GPU and the refresh rate of the display match each other, a vertical synchronization (Vsync) may be used to synchronize the frame rate of the GPU and the refresh rate of the display.

SUMMARY

The disclosure is direct to an image displaying method and a host, so as to avoid the tearing effect.

In this disclosure, an image displaying method is provided. The image displaying method includes: transferring, from an application to a handler layer of a system, a request signal for a vertical synchronization signal for rendering an image of a next frame; in response of the receiving the request signal by the handler layer, generating a local vertical synchronization signal by the handler layer without referencing a hardware vertical synchronization signal; and rendering, by the application, the image of the next frame based on the local vertical synchronization signal.

The application and the handler layer belong to a high-level programming layer.

In this disclosure, a host is provided. A host includes a memory storing a program code and a processor coupled to the memory. The processor is configured to accessing the program code to execute: transferring, from an application to a handler layer, a request signal for a vertical synchronization signal for rendering an image of a next frame; in response of the receiving the request signal by the handler layer, generating a local vertical synchronization signal by the handler layer; and rendering, by the application, the image of the next frame based on the local vertical synchronization signal. The application and the handler layer belong to a high-level programming layer.

Based on the above, according to the image display method and the host, the chance of the tearing effect happening is decreased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

While an application or a view is displayed by a display, a frame rate of the GPU and a refresh rate of the display are two important factors. If there is a discrepancy between the frame rate of the GPU and the refresh rate of the display, a tearing may be shown on the displayed image on the display.

In order to make the frame rate of the GPU and the refresh rate of the display match each other, a Vsync signal may be used to synchronize the frame rate of the GPU and the refresh rate of the display.

A tradition pipeline of Vsync signal may be started from an application layer, where the application or the view is. A request for Vsync signal of a next frame may be sent from the application layer to a handler layer (e.g., choreographer in android framework). The handler layer may send the request to a sampling layer (e.g., SurfaceFlinger layer in android framework). After the sampling layer received the request from the handler layer, a hardware Vsync signal may be sent from a hardware abstraction layer (HAL) to the sampling layer. The hardware Vsync signal may be generated based on the display. After the hardware Vsync signal is received by the sampling layer, the sampling layer may calculate a software Vsync signal and provide the software Vsync signal to the handler layer. The handler layer may transfer the software Vsync signal to the application layer. After the software Vsync signal is received by the application, the application layer may start drawing the content of the next frame. In this manner, the frame rate of the GPU and the refresh rate of the display may be synchronized to prevent the tearing from happening.

It is noted that, inter-process communication may bring latency to the Vsync signal. For example, for a frame rate of 90, an interval between frames is 1000 milliseconds/90 frames=11.11 milliseconds. From the experimental data, a difference between a maximum value and a minimum value of the hardware Vsync signal received by the sampling layer may be 0.038 milliseconds. On the other hand, a maximum value and a minimum value of the software Vsync signal received by the handler layer may be 0.8 milliseconds. That is, while the software Vsync signal is received by the handler layer, a latency to the Vsync signal may occur. Due to the inaccuracy of the software Vsync signal, the GPU may not be able to start drawing the content of the next frame accurately, thereby increasing the chance of tearing effect and decreasing the user experience. In addition, since the request for the Vsync signal is frame by frame, the computing power may be occupied at least partially due to the transmission of the Vsync signal. Therefore, it is the pursuit of people skilled in the art to provide an efficient and correct method to provide Vsync signal to the GPU.

Figure 1A:
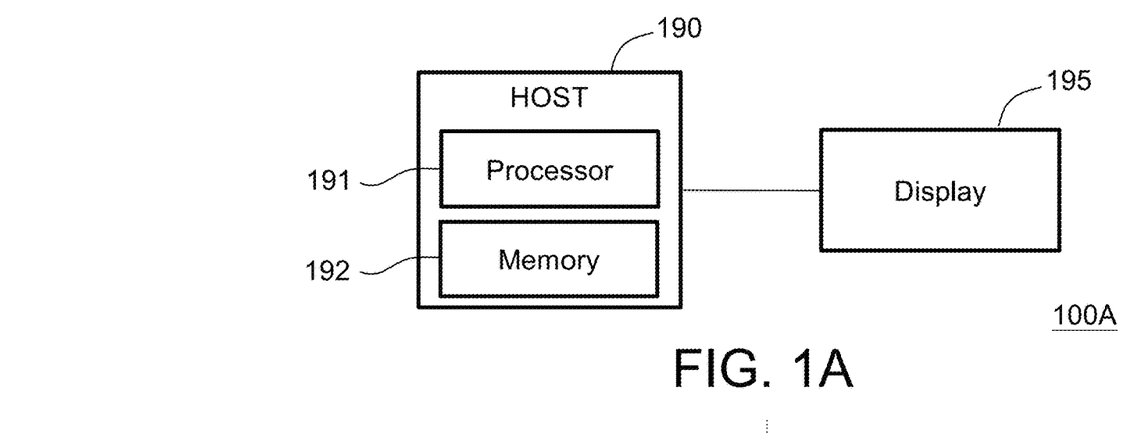
FIG. 1A is a schematic diagram of a hardware structure of an image displaying method according to an embodiment of the disclosure.

FIG. 1A is a schematic diagram of a hardware structure of an image displaying method according to an embodiment of the disclosure. With reference to FIG. 1A, a hardware structure 100A of the image displaying method may include a host 190 and a display 195 coupled to the host 190. In different embodiments, the host 190 may be implemented as various smart devices and/or computer devices, but is not limited thereto. In addition, the display 195 may be integrated in the host 190 or separated from the host 190, but is not limited thereto. The display 195 may include, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, the disclosure is not limited thereto.

In one embodiment, the host 190 may include a processor 191 and a memory 192. The processor 191 may be, for example, a GPU, general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other kind of integrated circuits, state machines, processors based on advanced RISC machine (ARM), and the like. The memory 192 is coupled to the processor 191 and may be, for example, any type of fixed or removable random access memory (RAM), read-only memory (ROM), flash memory, hard disk, any kind of non-transitory computer readable medium, other similar devices, or a combination of these devices and may be used to store multiple program codes or modules.

In an embodiment of this disclosure, the processor 191 may access the modules or program codes stored in the memory 192 to implement the image display method proposed by this disclosure, and the details of which are described below. However, this disclosure is not limited thereto.

Figure 1B:
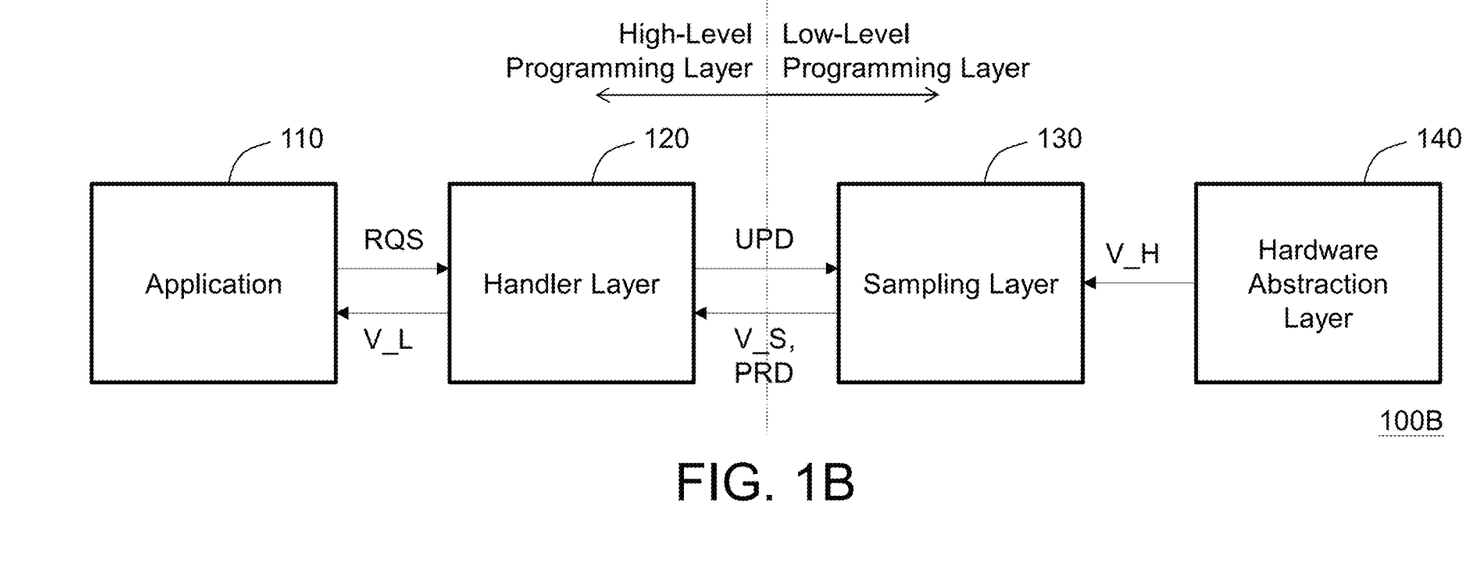
FIG. 1B is a schematic diagram of a software structure of an image displaying method according to an embodiment of the disclosure.

FIG. 1B is a schematic diagram of a software structure of an image displaying method according to an embodiment of the disclosure. With reference to FIG. 1B, a software structure 100B of the image displaying method may include an application 110 (also known as an application layer), a handler layer 120, a sampling layer 130, and a hardware abstraction layer (HAL) 140. The application 110, the handler layer 120, the sampling layer 130, and the hardware abstraction layer 140 may be modules and/or program codes stored in the memory 192, but are not limited thereto. Further, the handler layer 120, the sampling layer 130, and the hardware abstraction layer 140 may be part of a system. In one embodiment, the system may be an operating system and the operating system may be Android, IOS, or other similar systems. However, this disclosure is not limited thereto.

In one embodiment, the application 110 and the handler layer 120 may belong to a high-level programming layer and the sampling layer 130 and the hardware abstraction layer 140 may belong to a low-level programming layer. In one embodiment, a programming language of the high-level programming layer may be a relatively high-level programming language and a programming language of the relatively low-level programming layer may be a low-level (e.g., native) programming language. For example, a programming language of the high-level programming layer may be one of JAVA, Objective-C, and SWIFT, and a programming language of the low-level programming layer may be one of C and C++. However, this disclosure is not limited thereto.

In one embodiment, in the android framework, the application 110 may be an application or a view, the handler layer 120 may be a Choreographer layer or a Display Event Receiver layer, the sampling layer 130 may be a Surface-Flinger layer or a Display Sync Model layer, and the hardware abstraction layer 140 may be the HWComposer Layer. In another embodiment, in the iOS framework, the application 110 may be an application or a view, the handler layer 120 may be a CADisplayLink layer in the iOS framework, the sampling layer 130 may be a SurfaceFlinger layer or a Core Animation layer in the iOS framework, and the hardware abstraction layer 140 may be the IOSurface layer. However, this disclosure is not limited thereto.

Referring to FIG. 1B, the application 110 may send a request signal RQS for a Vsync signal for rendering an image of a next frame to the handler layer 120. After the handler layer 120 received the request signal RQS, the handler layer 120 may be configured to generate a local Vsync signal V_L and provide the local Vsync signal V_L to the application 110. Based on the local Vsync signal V_L, the application 110 may render the image of the next frame.

That is, the Vsync signal provided to the application 110 (i.e., the local Vsync signal V_L) is generated locally within the high-level programming layer instead of within the low-level programming level layer. In other words, the local Vsync signal V_L is generated without referencing a hardware Vsync signal V_H. In this manner, no inter-process communication is required for rendering an image of a next frame, thereby decreasing the chance of tearing effect and improving the user experience.

Alternatively, while parameters for calculating the local Vsync signal V_L do not exist (e.g., right after a starting up of the processor 191) or are not accurate, the hander layer 120 may be configured to send an update signal UPD for updating parameters for calculating the local Vsync signal V_L to the sampling layer 130. To be more specific, after the sampling layer 130 received the update signal UPD, the hardware Vsync signal V_H may be transfer from the hardware abstraction layer 140 to the sampling layer 130. The hardware Vsync signal V_H may be generated by the hardware abstraction layer 140 based on the display 195 coupled to the host 190. Based on the hardware Vsync signal and a loading of the processor 191, the sampling layer 130 may be configured to generate a software Vsync signal V_S. Further, by calculating an average interval between multiple frames of the hardware Vsync signal V_H, the sampling layer 130 may be configured to generate a software period PRD for each frame. Based on the software Vsync signal V_S and the software period PRD, the handler layer 120 may be configured to generate the local Vsync signal V_L and send the local Vsync signal V_L to the application 110. That is, the sampling layer 130 may be configured to predict (or determine) Vsync signals of multiple frames in the future (e.g., a further next frame and following frames) for rendering images of following frames based on the software Vsync signal V_S and the software period PRD. To be more specific, the software Vsync signal V_S may be utilized as the local Vsync signal V_L of the next frame and the local Vsync signals V_L of frames afterwards as may be calculated based on the software Vsync signal V_S and the software period PRD. In other words, after the parameters for calculating the local Vsync signal V_L are fetched, the Vsync signal provided to the application 110 may be generated locally. Therefore, the latency due to inter-process communication may be prevented, thereby decreasing the chance of tearing effect and improving the user experience.

In addition, after the software Vsync signal V_S and the software period PRD are sent to the handler layer 120, at each frame of the following frames, the sampling layer 130 may be configured to compare the hardware Vsync signal V_H of a current frame and the software Vsync signal V_S of a previous frame (i.e., the frame corresponding to the update signal UPD) to generate a offset value. For example, the offset value may be the difference between a timing of the hardware Vsync signal V_H and a timing of the software Vsync signal V_S, but is not limited thereto. It is noted that, while the offset value is greater than a threshold value, the tearing effect may occur in the image displayed by the display 195. That is, the threshold value is determined to prevent a tearing effect of the image displayed by the display 195 from happening. Therefore, in response to the offset value being greater than the threshold value, the sampling layer 130 may be configured to generate a new set of the software Vsync signal V_S and the software period PRD based on the hardware Vsync signal V_H of a current frame. Then, the new set of the software Vsync signal V_S and the software period PRD may be transferred to the handler layer 130. Based on the new set of the software Vsync signal V_S and the software period PRD, the handler layer 120 may be configured to update (or rather calibrate) the local Vsync signal V_L of the current frame. In this manner, the inter-process communication only happens while a calibration condition is triggered, thereby decreasing the loading of the processor 191, decreasing the energy consumption of the host 190 and improving the performance of the host 190.

In one embodiment, other than updating the parameters while the calibration condition being triggered, the parameters may be updated periodically. In other words, at a predetermined interval, the sampling layer 130 may be configured to generate the new set of software Vsync signal V_S and the software period PRD of the current frame. Similarly, based on the new set of the software Vsync signal V_S and the software period PRD, the handler layer 120 may be configured to update (or rather calibrate) the local Vsync signal V_L of the current frame. In this manner, the inter-process communication only happens while the predetermined interval has elapsed, thereby decreasing the loading of the processor 191, decreasing the energy consumption of the host 190 and improving the performance of the host 190.

It is noted that, while for the sake of convenience for explanation, the number of the application 110 is depicted as one in FIG. 1B, the number of the application 110 may be more than one and utilize the same local Vsync signal V_L for rendering images. In one embodiment, a first application and a second application may be stored in the memory 192 and executed by the processor 191. A first request signal for a first Vsync signal for rendering a first image of the next frame may be transferred from the first application to the handler 120. A second request signal for a second Vsync signal for rendering a second image of the next frame may be transferred from the second application to the handler 120. Further, the first application may render the first image of the next frame based on the local Vsync signal V_L. The second application may render the second image of the next frame based on the local Vsync signal V_L. Therefore, the first application and the second application may utilize the same local Vsync signal V_L for rendering images, thereby reducing the loading of the processor 191.

Figure 2:
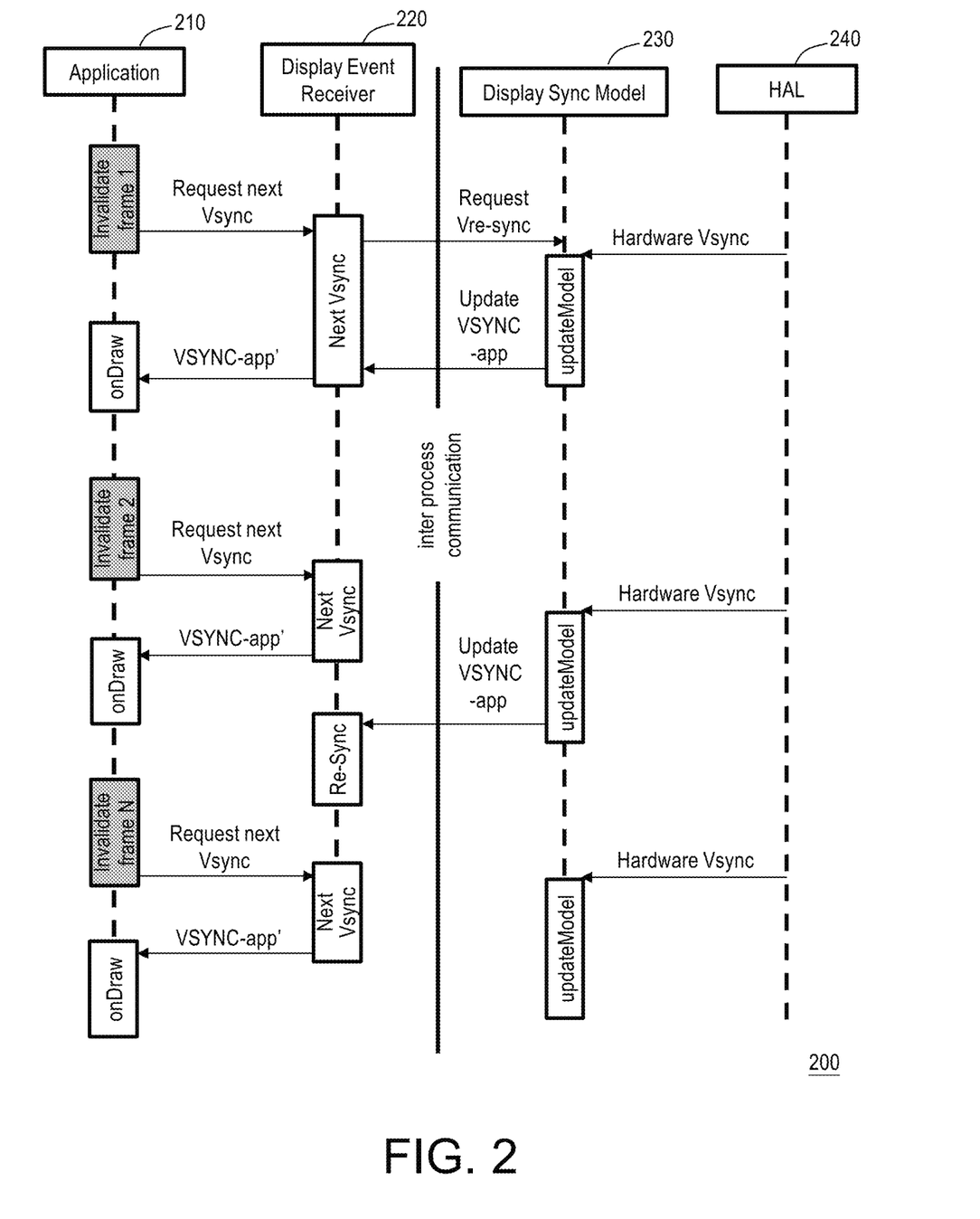
FIG. 2 is a schematic diagram of an exemplary pipeline of an image displaying method according to an embodiment of the disclosure.

FIG. 2 is a schematic diagram of an exemplary pipeline of an image displaying method according to an embodiment of the disclosure. With reference to FIG. 1A to FIG. 2, a pipeline 200 may be an exemplary pipeline of the software structure 100B of the image displaying method in FIG. 1A. In one embodiment, the pipeline 200 may include an application layer 210, a Display Event Receiver layer 220, a Display Sync Model layer 230, and a Hardware Abstraction layer (HAL) 240. The application layer 210, the Display Event Receiver layer 220, a Display Sync Model layer 230, and the HAL 240 may be one embodiment of the application 110, the handler layer 120, the sampling layer 130, and the hardware abstraction layer 140, respectively, but are not limited thereto.

In one embodiment, in order to keep the screen of the display 195 up-to-date, a command "invalidate frame" may be performed to tell a user interface (UI) rendering engine to redraw the screen. To tell the UI rendering engine when it is safe to draw the next frame, the application layer 210 may send an event "Request next Vsync" to the Display Event Receiver layer 220 to request a Vsync signal for the next frame. For example, a method "Next Vsync" in the Display Event Receiver 220 may receive the request for the next Vsync signal. Then, the method "Next Vsync" may generate the local Vsync signal V_L and send an event "VSYNC-app'" including the local Vsync signal V_L to a method "onDraw" in the application layer 210 to draw the content of the next frame. In this way, the screen of the display 195 may be kept up-to-date to either display content or an application or a view or fix a rendering error.

It is noted that, at the very first frame (e.g., frame 1), the method "Next Vsync" may not be ready to calculate the local Vsync signal V_L. Thus, in response to receiving the event "Request next Vsync", an event "Request Vre-sync" may be sent to the Display Sync Model layer 230. Then, a method "updateModel" may receive an event "Hardware Vsync" including the hardware Vsync signal V_H and generate the software Vsync signal V_S and the software period PRD based on the hardware Vsync signal V_H. Further, the method "updateModel" may send an event "Update VSYNC-app" including the software Vsync signal V_S and the software period PRD to the method "Next Vsync". Based on the content of the event "Update VSYNC-app", the method "Next Vsync" may be now ready to provide the event "VSYNC-app'" to the application layer 210.

On the other hand, for the frames after the very first frame (e.g., frame 2, frame 3, . . . ), the parameters for calculating the local Vsync signal V_L has been updated. Therefore, the method "Next Vsync" is able to provide the event "VSYNC-app'" to the application layer 210 directly without involving the Display Sync Model layer 230 and the HAL 240.

In addition, while a calibration condition is triggered, the method "updateModel" in the Display Sync Model layer 230 may send an event "Update VSYNC-app" to a method "Re-sync" in the Display Event Receiver layer 220. The method "Re-sync" in the Display Event Receiver layer 220 may provide a new set of the software Vsync signal V_S and the software period PRD to the method "Next Vsync" in the Display Event Receiver layer 220. Therefore, while the event "Request next Vsync" is received again, the method "Next Vsync" is ready to provide the event "VSYNC-app'" including an updated local Vsync signal V_L. In one embodiment, the calibration condition may include, for example, the offset from the hardware Vsync signal V_H to the software Vsync signal V_S being greater than a threshold value, a predetermined interval being elapsed, or other conditions according to design needs, but is not limited thereto.

Figure 3:
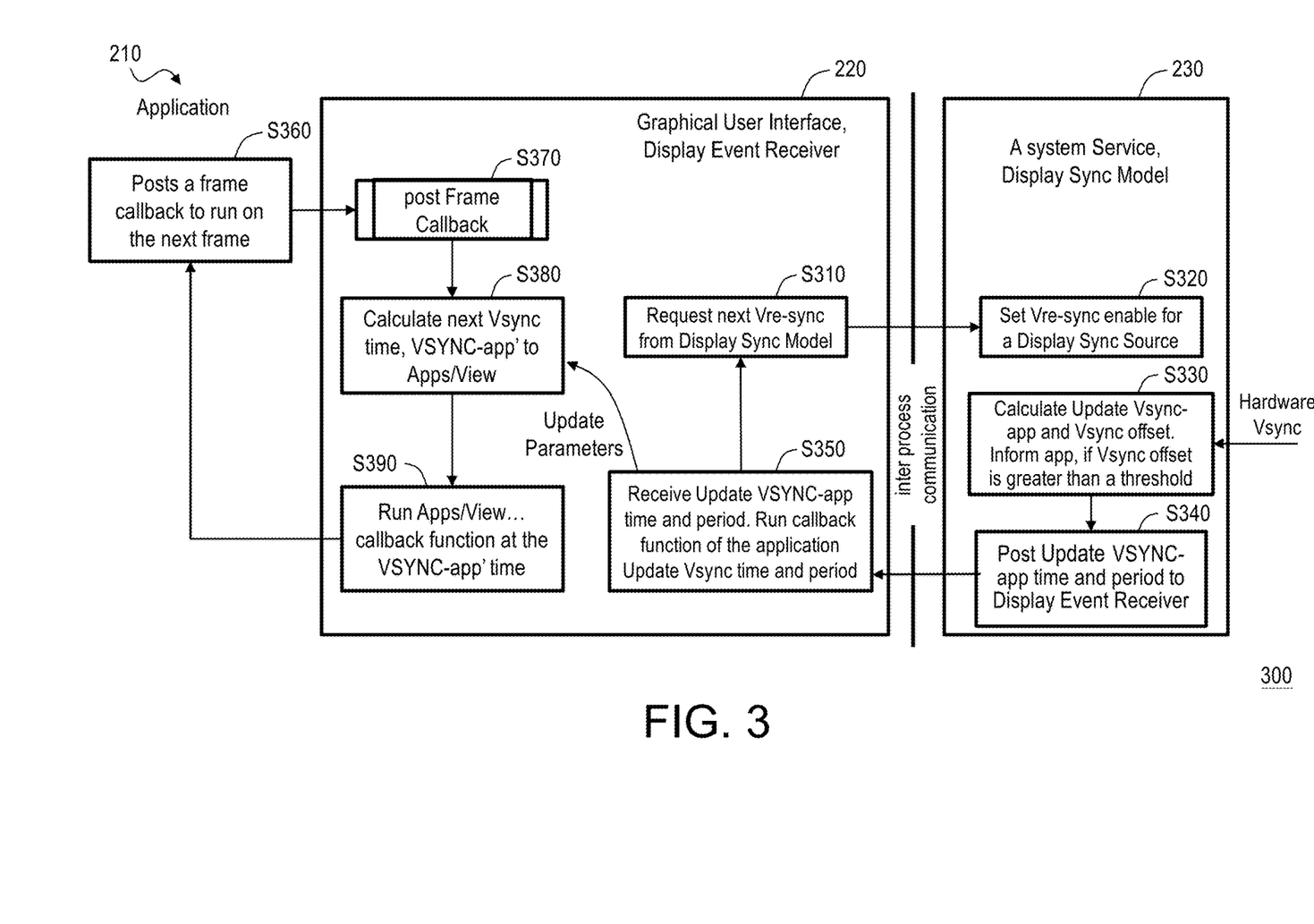
FIG. 3 is a schematic diagram of an exemplary flowchart of an exemplary pipeline according to an embodiment of the disclosure.

FIG. 3 is a schematic diagram of an exemplary flowchart of an exemplary pipeline according to an embodiment of the disclosure. With reference to FIG. 1A to FIG. 3, a flowchart 300 may be an exemplary flowchart of the pipeline 200 in FIG. 2. In one embodiment, the flowchart 300 may include a step S310 to a step S390, but is not limited thereto. In the flowchart 300, the Display Event Receiver layer 220 may be a graphic user interface (GUI) and the Display Sync Model layer 230 may be a system service. However, this disclosure is not limited thereto.

In the step S310, in order to request the parameters for calculating the local Vsync signal V_L from the Display Sync Model 230, the event "Request next Vre-sync" may be sent from the Display Event Receiver 220 to the Display Sync Model layer 230. In a step S320, a display sync source may be set to enable the vertical re-synchronization. In a step S330, after a hardware Vsync signal V_H is received, the event "update Vsync-app" and a Vsync offset are calculated. The event "update Vsync-app" may include the software Vsync signal V_S and the software period PRD. The Vsync offset may be the difference between a timing of the hardware Vsync signal V_H and a timing of the software Vsync signal V_S. In response to the Vsync offset being greater and a threshold value, the application layer 210 may be informed. In a step S340, the event "update VSYNC-app" (including the software period PRD) may be posted (sent) to the Display Event Receiver layer 220. In a step S350, after the Display Event Receiver layer 220 received the event "update Vsync-app" (including the software period PRD), a callback function of the application layer 210 may be performed to update the timing of the software Vsync signal V_S and the software period PRD.

In a step S360, while the application layer 210 intends to redraw the screen, the application layer 210 may provide (post) the callback function to the Display Event Receiver layer 220 to run on the next frame. In a step S370, after the Display Event Receiver layer 220 received the callback function, the callback function is waiting to be triggered. In a step S380, while the event "VSYNC-app" (including the software period PRD) is received by the Display Event Receiver layer 220, the timing of the next Vsync signal and the event "VSYNC-app'" (including the local Vsync signal V_L) may be calculated. In the step S390, while the next Vsync signal and the event "VSYNC-app'" are ready, the callback function may be triggered at the timing of the event "VSYNC-app'" to draw the next frame.

Figure 4:
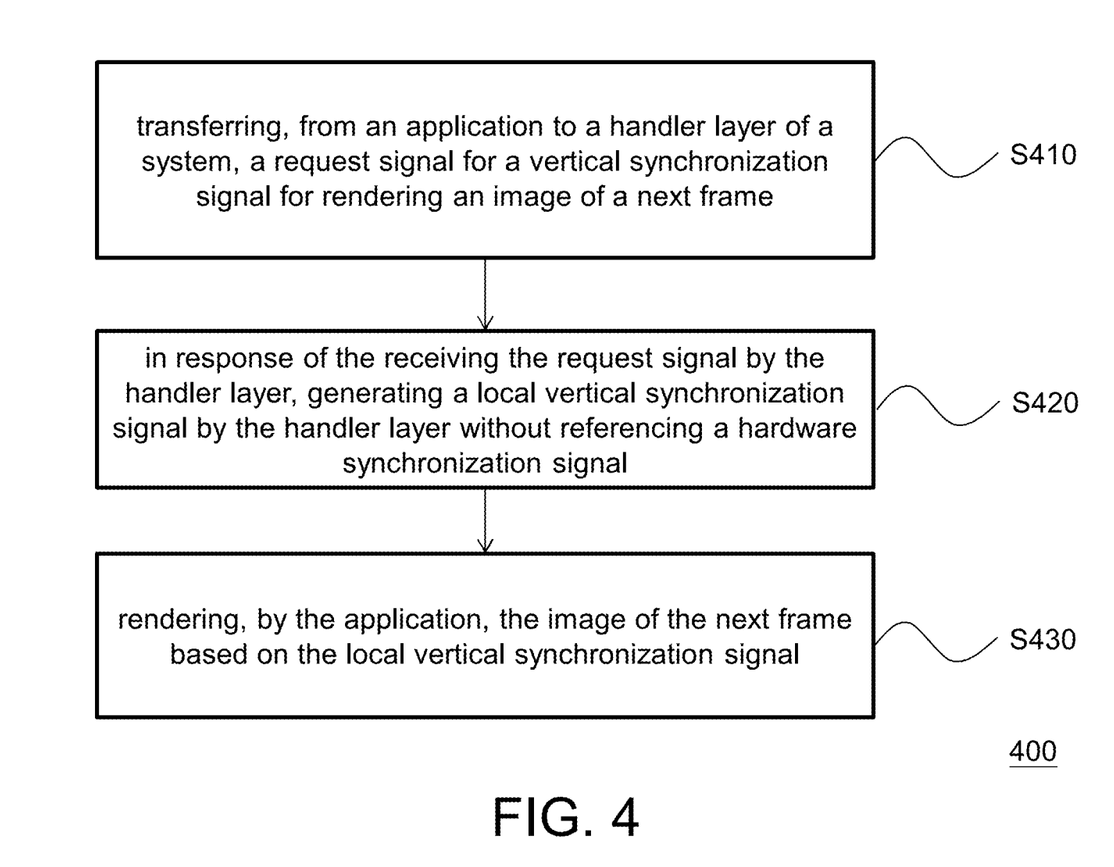
FIG. 4 is a schematic flowchart of an image displaying method according to an embodiment of the disclosure.

FIG. 4 is a schematic flowchart of an image displaying method according to an embodiment of the disclosure. With reference to FIG. 1 to FIG. 4, an image displaying method 400 may include a step S410, a step S420, and a step S430.

In the step S410, a request signal RQS for a Vsync signal for rendering an image of a next frame is transferred from the application 110 to the handler layer 120. It is noted that, the application 110 and the handler layer 120 belong to a high-level programming layer. In the step S420, in response of the receiving the request signal RQS by the handler layer 120, the handler 120 may be configured to generate a local Vsync signal V_L. In the step S430, the application 110 may be configured to render the image of the next frame based on the local Vsync signal V_L. In addition, the implementation details of the image displaying method 400 may be referred to the descriptions of FIG. 1 to FIG. 3 to obtain sufficient teachings, suggestions, and implementation embodiments, while the details are not redundantly described seriatim herein. Therefore, the frame rate of the GPU and the refresh rate of the display may be synchronized to prevent the tearing from happening.

Storage Medium

In summary, according to the image displaying method 400 and the host 190, the inter-process communication only happens while a calibration condition is triggered, thereby decreasing the loading of the processor 191, decreasing the energy consumption of the host 190 and improving the performance of the host 190.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image displaying method, comprising:
transferring, from an application to a handler layer of a system, a request signal for a vertical synchronization signal for rendering an image of a next frame;
sending a callback function, from the application to the handler layer of the system;
in response of the receiving the request signal and the callback function by the handler layer, generating a local vertical synchronization signal by the handler layer without referencing a hardware vertical synchronization signal; and in response to the local vertical synchronization signal being generated, rendering, by the application, the image of the next frame based on the local vertical synchronization signal by performing the callback function.

2. The image displaying method according to claim 1, further comprising:

in response to a starting up of the processor, transferring, from a hardware abstraction layer of the system to a sampling layer of the system, a hardware vertical synchronization signal;

generating, by the sampling layer, a software vertical synchronization signal and a software period based on the hardware vertical synchronization signal and a loading of the processor; and generating, by a handler layer of the system, the local vertical synchronization signal based on the software vertical synchronization signal and the software period.

3. The image displaying method according to claim 2, further comprising:

determining the local vertical synchronization signal for rendering an image of a further next frame based on the software vertical synchronization signal and the software period.

4. The image displaying method according to claim 2, further comprising:

comparing, by the sampling layer, the hardware vertical synchronization signal and the software vertical synchronization signal to generate a offset value; and in response to the offset value being greater than a threshold value, generating, by the sampling layer, the software vertical synchronization signal and the software period based on the hardware vertical synchronization signal.

5. The image displaying method according to claim 4, further comprising:

the threshold value is determined to prevent a tearing effect of the image displayed by a display from happening.

6. The image displaying method according to claim 2, further comprising:

generating, at a predetermined interval by the sampling layer, the software vertical synchronization signal and the software period based on the hardware vertical synchronization signal.

7. The image displaying method according to claim 1, further comprising:

transferring, from a first application to the handler layer, a first request signal for a first vertical synchronization signal for rendering a first image of the next frame;

transferring, from a second application to the handler layer, a second request signal for a second vertical synchronization signal for rendering a second image of the next frame;

transferring, from the handler layer to the first application and the second, the local vertical synchronization signal;

rendering, by the first application, the first image of the next frame based on the local vertical synchronization signal; and rendering, by the second application, the second image of the next frame based on the local vertical synchronization signal.

8. A host, comprising:
a memory, storing a program code; and
a processor, coupled to the memory and configured to accessing the program code to execute:

transferring, from an application to a handler layer of a system, a request signal for a vertical synchronization signal for rendering an image of a next frame;

sending a callback function, from the application to the handler layer of the system;

in response of the receiving the request signal and the callback function by the handler layer, generating a local vertical synchronization signal by the handler layer without referencing a hardware vertical synchronization signal; and in response to the local vertical synchronization signal being generated, rendering, by the application, the image of the next frame based on the local vertical synchronization signal by performing the callback function.

9. The host according to claim 8, wherein the processor further executes:

in response to a starting up of the processor, transferring, from a hardware abstraction layer of the system to a sampling layer of the system, a hardware vertical synchronization signal;

generating, by the sampling layer, a software vertical synchronization signal and a software period based on the hardware vertical synchronization signal and a loading of the processor; and generating, by a handler layer of the system, the local vertical synchronization signal based on the software vertical synchronization signal and the software period.

10. The host according to claim 9, wherein the processor further executes:

determining the local vertical synchronization signal for rendering an image of a further next frame based on the software vertical synchronization signal and the software period.

11. The host according to claim 9, wherein the processor further executes:

comparing, by the sampling layer, the hardware vertical synchronization signal and the software vertical synchronization signal to generate a offset value; and in response to the offset value being greater than a threshold value, generating, by the sampling layer, the software vertical synchronization signal and the software period based on the hardware vertical synchronization signal.

12. The host according to claim 11, wherein the processor further executes:

the threshold value is determined to prevent a tearing effect of the image displayed by a display from happening.

13. The host according to claim 9, wherein the processor further executes:

generating, at a predetermined interval by the sampling layer, the software vertical synchronization signal and the software period based on the hardware vertical synchronization signal.

14. The host according to claim 8, wherein the processor further executes:

transferring, from a first application to the handler layer, a first request signal for a first vertical synchronization signal for rendering a first image of the next frame;

transferring, from a second application to the handler layer, a second request signal for a second vertical synchronization signal for rendering a second image of the next frame;

transferring, from the handler layer to the first application and the second, the local vertical synchronization signal;

rendering, by the first application, the first image of the next frame based on the local vertical synchronization signal; and rendering, by the second application, the second image of the next frame based on the local vertical synchronization signal.

15. A non-transitory computer readable medium, storing programs to be loaded into a processor to perform steps of:

transferring, from an application to a handler layer of a system, a request signal for a vertical synchronization signal for rendering an image of a next frame;

sending a callback function, from the application to the handler layer of the system;

in response of the receiving the request signal and the callback function by the handler layer, generating a local vertical synchronization signal by the handler layer without referencing a hardware vertical synchronization signal; and in response to the local vertical synchronization signal being generated, rendering, by the application, the image of the next frame based on the local vertical synchronization signal by performing the callback function.

* * * * *